(12) United States Patent
Hen et al.

(10) Patent No.: US 12,554,538 B2
(45) Date of Patent: Feb. 17, 2026

(54) STATIC MEMORY ALLOCATION USING SAT SOLVER

(71) Applicant: SAMSUNG ELECTRONICS CO., LTD., Suwon-si (KR)

(72) Inventors: Ayelet Hen, Tel-Aviv (IL); Eilon Regev, Tel-Aviv (IL); Or Davidi, Tel-Aviv (IL); Yotam Avraham Platner, Tel-Aviv (IL); Tal Heller, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 412 days.

(21) Appl. No.: 18/312,397

(22) Filed: May 4, 2023

(65) Prior Publication Data

US 2024/0370299 A1 Nov. 7, 2024

(51) Int. Cl.
*G06F 9/46* (2006.01)
*G06F 9/30* (2018.01)
*G06F 9/50* (2006.01)

(52) U.S. Cl.
CPC ........ *G06F 9/5016* (2013.01); *G06F 9/30029* (2013.01); *G06F 9/5033* (2013.01)

(58) Field of Classification Search
CPC ... G06F 9/5016; G06F 9/30029; G06F 9/5033
See application file for complete search history.

(56) References Cited

U.S. PATENT DOCUMENTS

| | | | |
|---|---|---|---|
| 5,247,674 A | 9/1993 | Kogure | |
| 7,331,037 B2 | 2/2008 | Dickey et al. | |
| 7,401,305 B2 | 7/2008 | Shacham et al. | |
| 10,394,475 B2 | 8/2019 | Li et al. | |
| 10,664,310 B2 | 5/2020 | Bokhari et al. | |
| 11,170,307 B1 | 11/2021 | Ross et al. | |

(Continued)

FOREIGN PATENT DOCUMENTS

WO  WO 2021-219211  11/2021

OTHER PUBLICATIONS

Byung Hoon Ahn, et al. "Ordering Chaos; Memory-Aware Scheduling of Irregularly Wired Neural Networks for Edge Devices," Proceedings of the 3rd MLSys Conference, Austin TX USA, 2020.

(Continued)

*Primary Examiner* — Gregory A Kessler
(74) *Attorney, Agent, or Firm* — Morgan, Lewis & Bockius LLP (57) ABSTRACT

A method of statically allocating memory for a computer program includes splitting a computational graph associated with a plurality of static memory allocation constraints into a plurality of subgraphs; determining a memory allocation for each combination of subgraphs of the plurality of subgraphs using an SAT solver and a plurality of Boolean conditions that formalize the plurality of static memory allocation constraints; subdividing a subgraph of the plurality of subgraphs into a plurality of tiles, when the memory allocation for that subgraph cannot satisfy a hardware memory size constraint of the plurality of static memory allocation constraints; performing a performance analysis on all possible subgraphs and plurality of tiles; selecting a combination of subgraphs whose plurality of tiles has a best overall performance; and determining a memory allocation for the plurality of tiles for the selected combination of subgraphs using the SAT solver.

18 Claims, 4 Drawing Sheets

(56) References Cited

U.S. PATENT DOCUMENTS

| | | |
|---|---|---|
| 2018/0088996 A1 | 3/2018 | Rossi et al. |
| 2020/0192715 A1 | 6/2020 | Wang et al. |
| 2021/0089356 A1 | 3/2021 | Huang et al. |
| 2021/0279837 A1 | 9/2021 | Edwards |

OTHER PUBLICATIONS

Wei-Fen Lin et al., "ONNC: A Compilation Framework Connecting ONNX to Proprietary Deep Learning Accelerator." Published Mar. 1, 2019 ● Computer Science ● 2019 IEEE International Conference on Artificial Intelligence Circuits and Systems (AICAS).

FIG. 1

```
blob_0_offset >= 0,
blob_0_offset + blob_0_size <= 10 blob_1_offset >= 0
blob_1_offset + blob_1_size <= 10

Or( blob_0_offset + blob_0_size <= blob_1_offset,
    blob_1_offset + blob_1_size <= blob_0_offset )

blob_2_offset >= 0,
blob_2_offset + blob_2_size <= 10

Or( blob_0_offset + blob_0_size <= blob_2_offset,
    blob_2_offset + blob_2_size <= blob_0_offset )

Or( blob_1_offset + blob_1_size <= blob_2_offset,
    blob_2_offset + blob_2_size <= blob_1_offset )

blob_3_offset >= 0,
blob_3_offset + blob_3_size <= 10

Or( blob_1_offset + blob_1_size <= blob_3_offset,
    blob_3_offset + blob_3_size <= blob_1_offset )

Or( blob_2_offset + blob_2_size <= blob_3_offset,
    blob_3_offset + blob_3_size <= blob_2_offset )

And( blob_0_size == 4, blob_1_size == 3,
     blob_2_size == 2, blob_3_size == 5 )
```

Conditions related to allocation size and offset validity

Conditions related to the liveness analysis of each blob

STATIC MEMORY ALLOCATION USING SAT SOLVER

TECHNICAL FIELD

Embodiments of the present disclosure are directed to memory allocation of a process at compilation time.

DISCUSSION OF THE RELATED ART

An SAT problem is a Boolean satisfiability problem that can be formulated into Boolean conditions. Consider a meeting subject to the following conditions:

A. meeting time should be set before 16:00
B. meeting cannot end after 17:00
C. meeting should be at least 1 hour
D. meeting cannot start before 14:00

Two variables, MEETING_START and MEETING_DURATION, can be defined, and the above conditions can be formulated as the following Boolean condition:

MEETING_START<16:00 && MEETING_START+ MEETING_DURATION<=17:00 && MEETING_ DURATION>=1:00 && MEETING_START>=14:00

An SAT solver is a "black box" function that takes the above condition and tries to assign values to MEETING_START and MEETING_DURATION that satisfy (=true) the above. In the above example, there are multiple values that will satisfy the condition. An SAT will return only 1 of the possible solutions.

Static memory allocation refers to the process of allocating memory at compilation time. A neural network is commonly described by graph that includes nodes that represent mathematical operations, and edges that represents data flow and dependencies between the operations. Liveness analysis is a method of performing memory allocation in traditional compilers. A variable (or tensor) is said to be "alive" if its value is still needed by later operators; otherwise, a no-longer used value could have its memory space released for other variables (tensors) to use. If two variables have separate liveness durations, they can share same space of memory. This enables shrinking the memory footprint of a compilation model.

Using liveness analysis and memory sizes, one can start the process of performing static memory allocation. The challenge is to develop a method that when given: (1) an amount of physical memory; (2) memory requirements; and (3) a liveness analysis, can either find an allocation that satisfies both size and liveness or indicate that memory cannot be allocated. Liveness is translated to set of conditions that prevent overlap between allocations at specific times, and size indicates the size of required allocation. Specific hardware (HW) designs may require adding specific allocation restrictions on top of the regular allocation restrictions, such as size and liveness.

Memory is divided into multiple banks, and each bank can have finite number of modes. As an example of as specific hardware allocation refraction, suppose a memory has 3 banks and 2 modes, and each mode indicates whether a bank is used for read or write:

|        | Bank 0 | Bank 1 | Bank 2 |
|--------|--------|--------|--------|
| Mode 0 | read   | read   | write  |
| Mode 1 | write  | write  | read   |

The above is simple example for case in which the memory allocation should take into consideration the purpose of the bank during allocation. In addition, the mode is also a variable that the SAT solver should solve at each time frame.

Figure 1:
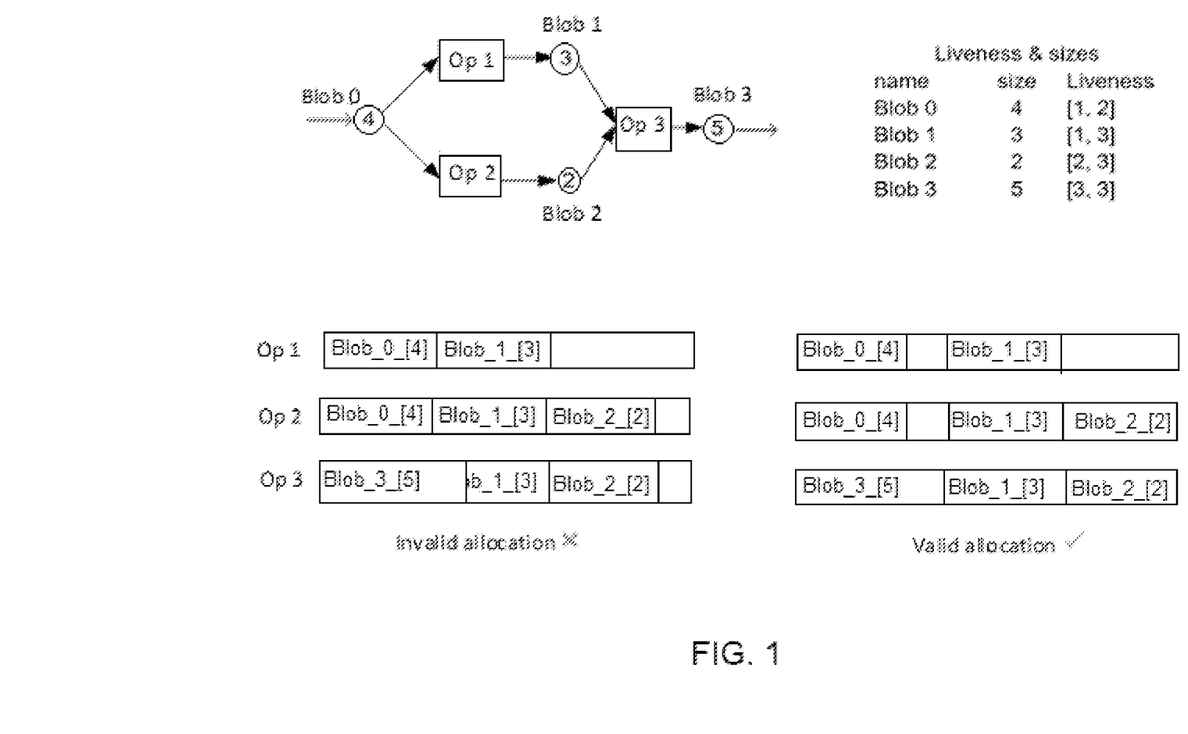
FIG. 1 illustrates an example of basic allocation task that has no specific HW restriction.

FIG. 1 illustrates an example of basic allocation task that has no specific HW restriction. The graph on the left illustrates the operations Blob_3=Blob_1 OP3 Blob_2= (OP1 Blob_0) OP3 (OP2 Blob_0), where OP1 and OP2 are unary operators, and OP3 is a binary operator, and a Blob is a memory with a specific size. The operator OP can be any type of operation, such as convolution. For example, assume a convolution with input of [z=3, y=100, x=100] and output of [z=64, y=98, x=98]. Then the input blob contains 3×100× 100 elements and the output blob contains 64×98×98 elements. In FIG. 1, the OPs can be regarded as a timeline at each OP; e.g., OP1: blob0(input) and blob1(output) should be allocated. The size of each blob is given in the size column of the table on the upper right, and the [A, B] notation in the liveness column in the upper right of FIG. 1 is the liveness of the blob from OP [A] to OP [B]. For example, Blob_0 has size 4 and is live for OP1 and OP2, while BLOB_1 has size 3 and is live for OP1 and OP3, etc. The memory bank for each operation in FIG. 1 has size 10. On the left of FIG. 1, the application of a conventional heuristic approach, such as a "first fit" allocation procedure that places a blob into the first bank into which the blob can fit, ends with an invalid allocation since the allocator cannot find an allocation for Blob3 at time OP3 since there is no continuous memory space with size 5, whereas the right side illustrates a valid allocation.

SUMMARY

According to an embodiment of the disclosure, there is provided a method of statically allocating memory for a computer program that includes splitting a computational graph associated with a plurality of static memory allocation constraints into a plurality of subgraphs, where a memory allocation for each the plurality of subgraphs can be solved separately for each subgraph, determining a memory allocation for each combination of subgraphs of the plurality of subgraphs using an SAT solver and a plurality of Boolean conditions that formalize the plurality of static memory allocation constraints, subdividing a subgraph of the plurality of subgraphs into a plurality of tiles, when the memory allocation for that subgraph cannot satisfy a hardware memory size constraint of the plurality of static memory allocation constraints, performing a performance analysis on all possible subgraphs and plurality of tiles, selecting a combination of subgraphs whose plurality of tiles has a best overall performance, and determining a memory allocation for the plurality of tiles for the selected combination of subgraphs using the SAT solver.

According to a further embodiment of the disclosure, the computational graph includes operations associated with nodes and dependencies between operations represented by directed edges between nodes, and the plurality of subgraphs includes all possible combinations of consecutive nodes of the computational graph.

According to a further embodiment of the disclosure, the plurality of static memory allocation constraints includes constraints involving cross memory restrictions of memories that need to exist together, and constraints involving allocation size.

According to a further embodiment of the disclosure, a tile is subset of data used by one or more operations of a subgraph independently from other subsets of data used by those one or more operations, and subdividing a subgraph of the plurality of subgraphs into a plurality of tiles includes subdividing the subgraph into a minimal number of tiles, wherein the minimum number of tiles depends on a maximum tile size that can be allocated, According to a further embodiment of the disclosure, the method comprises, when determining a memory allocation for the plurality of tiles for the selected combination of subgraphs using the SAT solver finds a memory allocation solution, increasing the tile size and replacing those constraints that involve memory size.

According to a further embodiment of the disclosure, the method comprises, when determining a memory allocation for the plurality of tiles for the selected combination of subgraphs using the SAT solver does not find a memory allocation solution, reducing the tile size.

According to a further embodiment of the disclosure, the method comprises, when the memory allocation for that subgraph satisfies a hardware memory size constraint of the plurality of static memory allocation constraints, replacing a Boolean condition for allocation size in the plurality of Boolean conditions with a Boolean condition for a larger allocation size that satisfies the hardware memory size constraint, wherein a new plurality of Boolean conditions is generated, and determining the memory allocation for the plurality of tiles using the SAT solver and the new plurality of Boolean conditions.

According to a further embodiment of the disclosure, the method comprises subdividing a subgraph of the plurality of subgraphs into a plurality of tiles when a time for determining the memory allocation that subgraph of the plurality of subgraphs has been exceeded.

According to a further embodiment of the disclosure, the performance analysis for each subgraph is a hardware simulation of executing operations of each subgraph that use tiles of the subgraph, and a cost of using the tiles of the subgraph, the cost is a weighted average of one or more of power requirements, memory requirements, bandwidth, and latency, and the best overall performance is determined by the weighted average.

According to an embodiment of the disclosure, there is provided a method of statically allocating memory for a computer program that includes splitting a computational graph associated with a plurality of static memory allocation constraints into a plurality of subgraphs, where a memory allocation for each the plurality of subgraphs can be solved separately for each subgraph, determining a memory allocation for each combination of subgraphs of the plurality of subgraphs using an SAT solver and a plurality of Boolean conditions that formalize the plurality of static memory allocation constraints, replacing a Boolean condition for allocation size in the plurality of Boolean conditions with a Boolean condition for a larger allocation size that satisfies the hardware memory size constraint, where a new plurality of Boolean conditions is generated, when the memory allocation for that subgraph satisfies a hardware memory size constraint of the plurality of static memory allocation constraints, and determining the memory allocation for the plurality of tiles using the SAT solver and the new plurality of Boolean conditions.

According to a further embodiment of the disclosure, the method comprises subdividing a subgraph of the plurality of subgraphs into a plurality of tiles, when the memory allocation for that subgraph cannot satisfy a hardware memory size constraint of the plurality of static memory allocation constraints, performing a performance analysis on all possible subgraphs and plurality of tiles, selecting a combination of subgraphs whose plurality of tiles has a best overall performance, and determining a memory allocation for the plurality of tiles for the selected combination of subgraphs using the SAT solver.

According to an embodiment of the disclosure, there is provided a non-transitory program storage device readable by a computer, tangibly embodying a program of instructions executed by the computer to perform a method for statically allocating memory for a computer program.

DETAILED DESCRIPTION

Embodiments of the disclosure provide a generic method for static memory allocation for a computation graph. An exemplary, non-limiting example of a computational graph is a neural network. The allocation method has the flexibility to adopt specific HW restrictions. Since a method according to an embodiment stands in the core of an automatic HAS\NAS flow, it should also be optimized in terms of runtime. HAS is a hardware architecture search: the procedure of searching for the best HW in terms of (area, power, bandwidth, performance) for specific networks (algorithm). During that procedure, multiple HW configurations are tried that differ by amount of memory, calculation units, etc. NAS is a network architecture search: on top of the HAS one can also search for best network for a particular task, such as face detection. Each possible network should have a score that reflects the in terms performance of power\area\latency\bandwidth\accuracy. Note that HAS is performed on set of algorithms: for each set of neural networks, a HAS should be run to find the best HW for the set.

Embodiments of the disclosure provide a static memory allocation method that can be formalized into a set of Boolean conditions for any specific HW design, and can use any SAT solver for static memory allocation. Embodiments of the disclosure provide a solution for a specific sequence of tile sizes. Embodiments of the disclosure provide optimize the SAT solver runtime performance by replacing only part of the restrictions. Embodiments of the disclosure are flexible so that specific HW restrictions can be added to the allocation task, so that an allocation method according to an embodiment can be adapted to future HW designs.

General Framework

According to an embodiment of the disclosure, static memory allocation constraints are formalized as an SAT task. This allows an off the shelf SAT solver to be used to solve the allocation. A formalized SAT task according to an embodiment includes 2 types of constraints: (1) Constraints that involve cross memory restrictions, so that memories should exist together; and (2) Constraints involving allocations sizes. The set of sizes is a result of the compiler decisions regarding a computational graph. Some embodiments include a third, hardware-specific constraint type for selecting a specific memory mode. In general, a computational graph is a graph with operations and dependencies between the operations, such as a neural net, although embodiments of the disclosure are applicable to any type of computational graph, not just neural nets. The computational graph includes operations associated with nodes and dependencies between operations represented by directed edges between nodes, and is representative of a program or computer system being compiled. The computational graph can be split into subgraphs, in which each subgraph is a sequence of consecutive operations for which the allocation task needs to be solved. Embodiments assume that subgraph allocations do not depend on each other and that each subgraph allocation can be solved separately.

If the allocation of a subgraph cannot fit into a specific HW memory size, the subgraph can be divided into tiles, so that required allocation sizes are not assumed to be linear function of the tile size. A tile differs from a subgraph in that a tile refers to a chunk or subset of data that is used by an operation of the subgraph independently from other chunks of data. A typical, non-limiting application of a neural network is computer vision, for which the data is 3-dimensional. A maximum tile size is the largest tile size that will fit into a memory block.

In an embodiment, the allocation task turns into optimization task of finding a maximum tile size. For runtime optimization, the allocation task is formalized for a specific size by taking a subset of the computational graph and breaking it into smaller computational problems. For example, if a single convolution cannot fit into HW memory, it can be broken into pieces, by, e.g., calculating only Y lines of an input image and repeating this for the entire image. By taking a subgraph and breaking it into tiles, only the "blob" size restrictions are effected, not the liveness restrictions between the blobs. If a solution is found, the tile size can be increased and only constrains that involve memory size are replaced. Otherwise, if there is no solution for the maximum tile size or a timeout is exceeded, the tile size is reduced. Replacing only part of the restrictions results in a faster SAT convergence.

Figure 2:
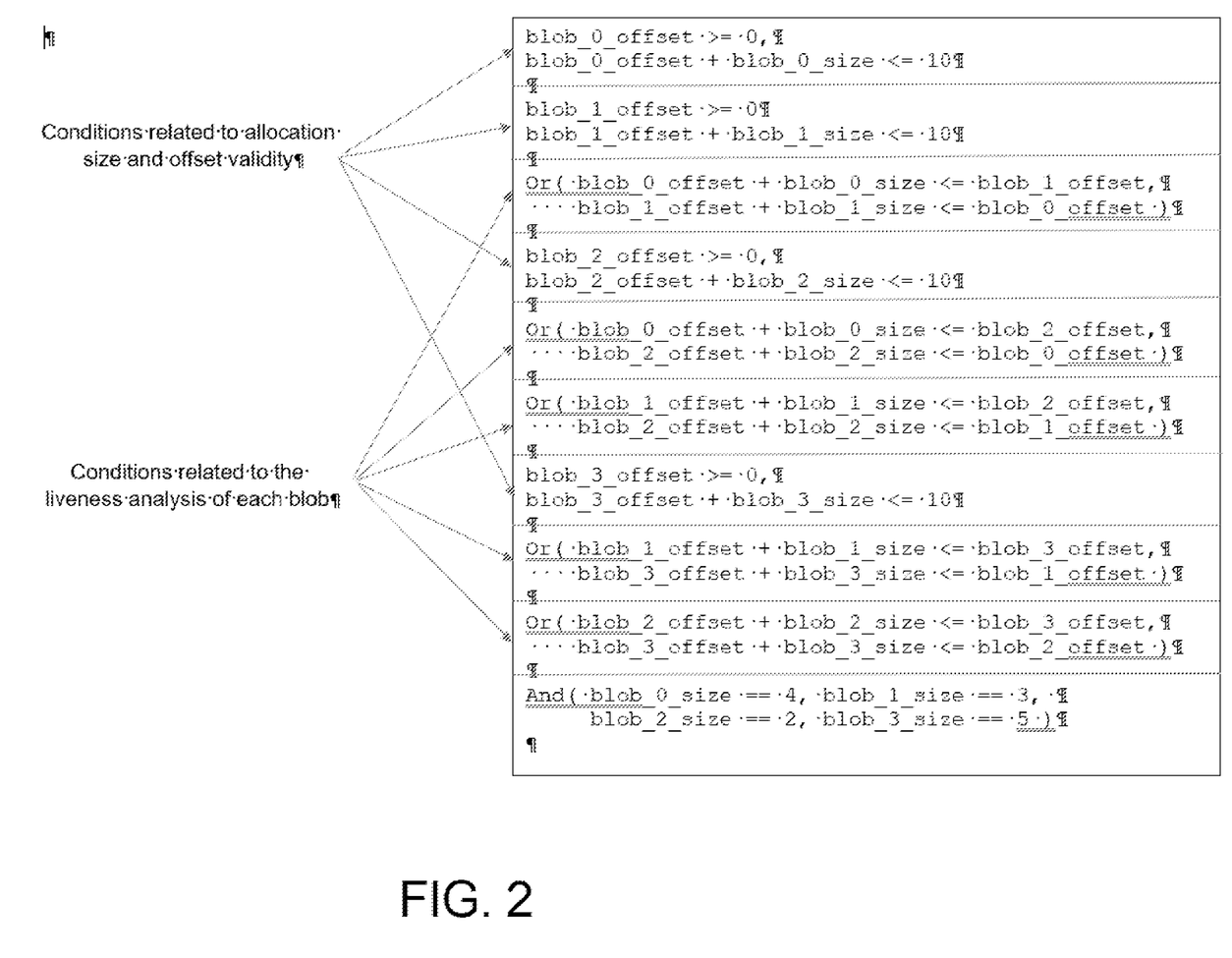
FIG. 2 illustrates a SAT solver that can find a solution that satisfies all the conditions in a stack, according to embodiments of the disclosure.

FIG. 2 illustrates a formalization of the task presented in FIG. 1, which is an SAT solver that can find a solution that satisfies all the conditions in the stack on the right side. The stack includes conditions related to allocation size and offset validity, and conditions related to the liveness analysis of each blob. If a solution cannot be found, either by an SAT solver that returns UNSAT or by a timeout mechanism, the last condition is replaced by a relaxed condition with smaller allocations sizes.

Embodiments of the disclosure enable finding solution for complex allocation problem when heuristic methods fail, and optimize runtime performance for complex allocation when heuristic methods takes exponential time. A generic memory allocation engine according to an embodiment uses an adaptation layer for specific HW restrictions, where the adaptation layer is the software part that provides the specific HW constrains. A method according to an embodiment can quickly adopt HW constraints, which shortens development time, and can optimize HW by removing some restrictions and updating the HW structure based on solutions found by the SAT solver. For example, considering a HW restriction, the allocator determines which memory modes are used and then removes unused memory modes from the HW implementation. This operation reduces the connectivity of the SRAM banks to the HW logic and thus reduces the silicon area.

Figure 3:
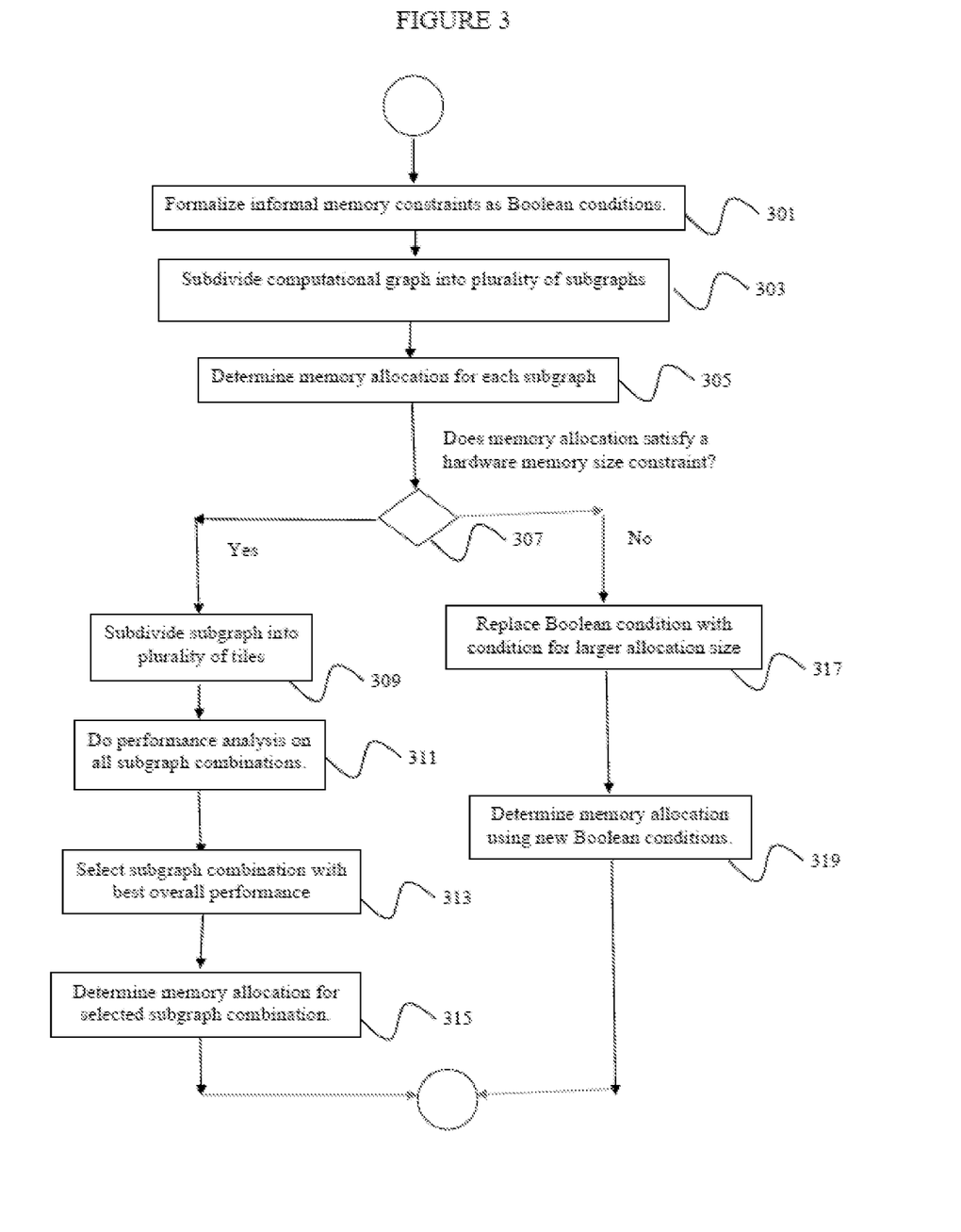
FIG. 3 is a flowchart of a memory allocation process according to an embodiment.

FIG. 3 is a flowchart of a memory allocation process according to an embodiment. A memory allocation process according to an embodiment starts at step 301 by formalizing a set of informal memory constraints as a set of Boolean conditions. The routines that perform this formalization is the adaptation layer disclosed above, and are specific routines for a specific HW under consideration. For example, if the allocated memory offset must be aligned to 4 bytes, where 0, 4, 8, . . . , are valid offsets, and 3 is an invalid offset, then the adaptation layer adds this as a Boolean condition: OFFSET % 4==0, etc.

The computational graph is subdivided into a plurality of subgraphs at step 303. Initially, the plurality of subgraphs includes all possible combinations of consecutive nodes in the computation graph. For example, consider a small network of 4 layers, which no forks or jumps: IN→Op1→Op2→OP3→OP4→OUT. In this small example, there are 10 different subgraphs: [OP1], [OP2], [OP3], [OP4], [OP1+OP2], [OP2+OP3], [OP3+OP4], [OP1+OP2+OP3], [OP2+OP3+OP4], [OP1+OP2+OP3+OP4]. Note that one of these subgraphs is the full graph. In general, a computational graph of n nodes will have order $n^2$ different subgraphs, which is too many to check each option. In general, a method according to an embodiment looks for the best combinations of subgraphs that "solve" the computational graph, so that each OP is included in exactly 1 sequence. There is order of $2^N$ options for the different combinations. An SAT solver formalizes heuristics to provide a reliable method of memory allocation for a specific algorithm, given a specific network. Then, at step 305, a memory allocation for each subgraph of the plurality of subgraphs is determined using the SAT solver that uses the plurality of Boolean conditions.

If, at step 307, the memory allocation for a subgraph cannot satisfy a hardware memory size constraint of the plurality of static memory allocation constraints, that subgraph of the plurality of subgraphs is subdivided into a plurality of tiles at step 309. Each subgraph is subdivided into a minimal number of tiles, where the minimum number of tiles depends on a maximum tile size that can be allocated. After determining the minimum number of tiles for each subgraph, a performance analysis is performed at step 311 on all possible subgraphs, and a combination of subgraphs whose plurality of tiles has a best overall performance is selected at step 313.

The performance analysis of each subgraph is a hardware-based analysis of executing operations of each subgraph that use tiles of the subgraph that considers the various factors that affect the cost of executing operations that use the tiles of the subgraph, such as power, memory, bandwidth, latency, etc., and calculates a weighted average of these factors. A best subgraph combination is determined from the tile performance scores, such as the weighted averages, for each sequence of subgraph operations.

For example, consider a 10×10 subset of a 10×20 data set being subject to a discrete convolution with a 3×3 kernel. This is an example of a subgraph with 3 operations, with each being a convolution. In a first pass of the convolution, the 10×20 data set is reduced to a 8×18 data set with a 8×8 subset, and in a second pass, the 8×18 data set is reduced to a 6×16 data set with a 6×6 subset. The subsets are a tile, and the tile analysis takes into account whether the 6×6 subset, the 8×8 subset and the original 10×10 subset can satisfy the specific hardware memory constraints.

At step 315, the memory allocation for the plurality of tiles for the selected combination of subgraphs is determined using the SAT solver. If a memory allocation solution is found, the tile size can be increased and only those constraints that involve memory size are replaced. Otherwise, if there is no solution for the maximum tile size or a timeout is exceeded, the tile size is reduced.

On the other hand, if it is determined at step 307 that the memory allocation for a subgraph does satisfy a hardware memory size constraint of the plurality of static memory allocation constraints, at step 317, a Boolean condition for allocation size in the plurality of Boolean conditions is replaced with a Boolean condition for a larger allocation size that satisfies the hardware memory size constraint, wherein a new plurality of Boolean conditions is generated; and at step 319, the memory allocation for the plurality of tiles is determined using the SAT solver and the new plurality of Boolean conditions.

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangibly embodied on a computer readable program storage device. The application program can be uploaded to, and executed by, a machine comprising any suitable architecture.

Figure 4:
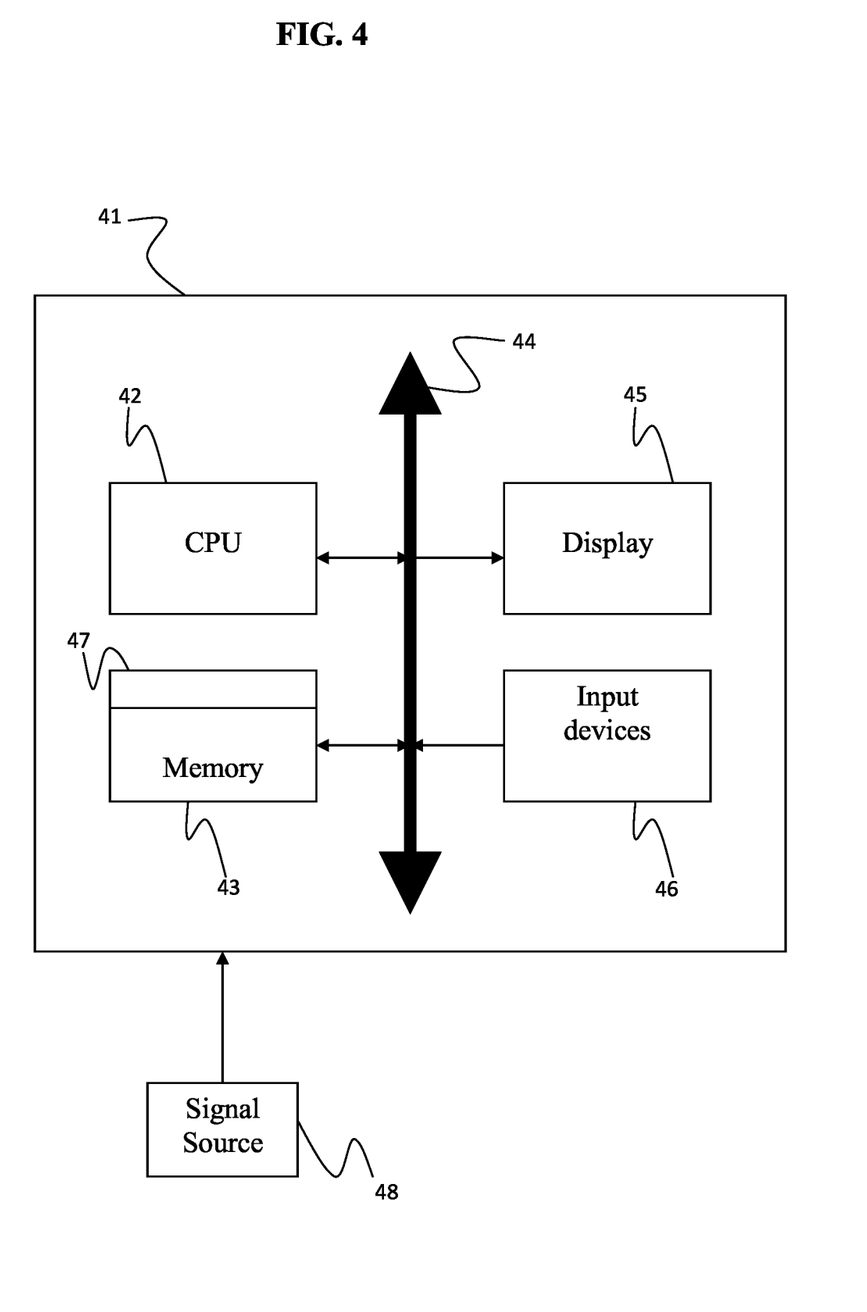
FIG. 4 is a block diagram of a system for implementing a method of static memory allocation using an SAT solver, according to an embodiment of the disclosure.

FIG. 4 is a block diagram of a system for implementing a method of static memory allocation using an SAT solver, according to an embodiment of the disclosure. Referring now to FIG. 4, a computer system 41 for implementing the present disclosure can comprise, inter alia, a central processing unit (CPU) or controller 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present disclosure can be implemented as a routine 47 that is stored in memory 43 and executed by the CPU or controller 42 to process the signal from the signal source 48. As such, the computer system 41 is a general purpose computer system that becomes a specific purpose computer system when executing the routine 47 of the present disclosure. Alternatively, as described above, embodiments of the present disclosure can be implemented as an ASIC or FPGA 47 that is in signal communication with the CPU or controller 42 to process the signal from the signal source 38.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method of statically allocating memory for a computer program, comprising:
splitting a computational graph associated with a plurality of static memory allocation constraints into a plurality of subgraphs, wherein a memory allocation for each the plurality of subgraphs can be solved separately for each subgraph;
determining a memory allocation for each combination of subgraphs of the plurality of subgraphs using an SAT solver and a plurality of Boolean conditions that formalize the plurality of static memory allocation constraints;
subdividing a subgraph of the plurality of subgraphs into a plurality of tiles, when the memory allocation for that subgraph cannot satisfy a hardware memory size constraint of the plurality of static memory allocation constraints;
performing a performance analysis on all possible subgraphs and plurality of tiles;
selecting a combination of subgraphs whose plurality of tiles has a best overall performance; and
determining a memory allocation for the plurality of tiles for the selected combination of subgraphs using the SAT solver.

2. The method of claim 1, wherein the computational graph includes operations associated with nodes and dependencies between operations represented by directed edges between nodes, and the plurality of subgraphs includes all possible combinations of consecutive nodes of the computational graph.

3. The method of claim 1, wherein the plurality of static memory allocation constraints includes constraints involving cross memory restrictions of memories that need to exist together, and constraints involving allocation size.

4. The method of claim 1, wherein
a tile is subset of data used by one or more operations of a subgraph independently from other subsets of data used by those one or more operations, and
subdividing a subgraph of the plurality of subgraphs into a plurality of tiles includes subdividing the subgraph into a minimal number of tiles, wherein the minimum number of tiles depends on a maximum tile size that can be allocated.

5. The method of claim 1, further comprising, when determining a memory allocation for the plurality of tiles for the selected combination of subgraphs using the SAT solver finds a memory allocation solution, increasing the tile size and replacing those constraints that involve memory size.

6. The method of claim 1, further comprising, when determining a memory allocation for the plurality of tiles for the selected combination of subgraphs using the SAT solver does not find a memory allocation solution, reducing the tile size.

7. The method of claim 1, further comprising, when the memory allocation for that subgraph satisfies a hardware memory size constraint of the plurality of static memory allocation constraints, replacing a Boolean condition for allocation size in the plurality of Boolean conditions with a Boolean condition for a larger allocation size that satisfies the hardware memory size constraint, wherein a new plurality of Boolean conditions is generated; and determining the memory allocation for the plurality of tiles using the SAT solver and the new plurality of Boolean conditions.

8. The method of claim 1, further comprising subdividing a subgraph of the plurality of subgraphs into a plurality of tiles when a time for determining the memory allocation that subgraph of the plurality of subgraphs has been exceeded.

9. The method of claim 1,
wherein the performance analysis for each subgraph is a hardware simulation of executing operations of each subgraph that use tiles of the subgraph, and a cost of using the tiles of the subgraph,
wherein the cost is a weighted average of one or more of power requirements, memory requirements, bandwidth, and latency, and
wherein the best overall performance is determined by the weighted average.

10. A non-transitory program storage device readable by a computer, tangibly embodying a program of instructions executed by the computer to perform a method for statically allocating memory for a computer program, the method comprising:

splitting a computational graph associated with a plurality of static memory allocation constraints into a plurality of subgraphs, wherein a memory allocation for each the plurality of subgraphs can be solved separately for each subgraph;

determining a memory allocation for each combination of subgraphs of the plurality of subgraphs using an SAT solver and a plurality of Boolean conditions that formalize the plurality of static memory allocation constraints;

subdividing a subgraph of the plurality of subgraphs into a plurality of tiles, when the memory allocation for that subgraph cannot satisfy a hardware memory size constraint of the plurality of static memory allocation constraints;

performing a performance analysis on all possible subgraphs and plurality of tiles;

selecting a combination of subgraphs whose plurality of tiles has a best overall performance; and determining a memory allocation for the plurality of tiles for the selected combination of subgraphs using the SAT solver.

11. The non-transitory computer readable program storage device of claim 10, wherein the computational graph includes operations associated with nodes and dependencies between operations represented by directed edges between nodes, and the plurality of subgraphs includes all possible combinations of consecutive nodes of the computational graph.

12. The non-transitory computer readable program storage device of claim 10, wherein the plurality of static memory allocation constraints includes constraints involving cross memory restrictions of memories that need to exist together, and constraints involving allocation size.

13. The non-transitory computer readable program storage device of claim 10, wherein
a tile is subset of data used by one or more operations of a subgraph independently from other subsets of data used by those one or more operations, and
subdividing a subgraph of the plurality of subgraphs into a plurality of tiles includes subdividing the subgraph into a minimal number of tiles, wherein the minimum number of tiles depends on a maximum tile size that can be allocated.

14. The non-transitory computer readable program storage device of claim 10, wherein the method further comprises, when determining a memory allocation for the plurality of tiles for the selected combination of subgraphs using the SAT solver finds a memory allocation solution, increasing the tile size and replacing those constraints that involve memory size.

15. The non-transitory computer readable program storage device of claim 10, wherein the method further comprises, when determining a memory allocation for the plurality of tiles for the selected combination of subgraphs using the SAT solver does not find a memory allocation solution, reducing the tile size.

16. The non-transitory computer readable program storage device of claim 10, wherein the method further comprises, when the memory allocation for that subgraph satisfies a hardware memory size constraint of the plurality of static memory allocation constraints, replacing a Boolean condition for allocation size in the plurality of Boolean conditions with a Boolean condition for a larger allocation size that satisfies the hardware memory size constraint, wherein a new plurality of Boolean conditions is generated; and determining the memory allocation for the plurality of tiles using the SAT solver and the new plurality of Boolean conditions.

17. The non-transitory computer readable program storage device of claim 10, wherein the method further comprises subdividing a subgraph of the plurality of subgraphs into a plurality of tiles when a time for determining the memory allocation that subgraph of the plurality of subgraphs has been exceeded.

18. The non-transitory computer readable program storage device of claim 10,
wherein the performance analysis for each subgraph is a hardware simulation of executing operations of each subgraph that use tiles of the subgraph, and a cost of using the tiles of the subgraph,
wherein the cost is a weighted average of one or more of power requirements, memory requirements, bandwidth, and latency, and
wherein the best overall performance is determined by the weighted average.

* * * * *